V. BENDIX.
FRICTION DRIVE FOR MOTOR VEHICLES.
APPLICATION FILED AUG. 7, 1906.

905,980.

Patented Dec. 8, 1908.
2 SHEETS—SHEET 1.

Witnesses:
Harry S. Lewis
Bert Pfiffer

Inventor:
Vincent Bendix
By R. J. Jackes
Atty.

V. BENDIX.
FRICTION DRIVE FOR MOTOR VEHICLES.
APPLICATION FILED AUG. 7, 1906.

905,980.

Patented Dec. 8, 1908.

2 SHEETS—SHEET 2.

Witnesses:
Harry S. Lewis
Peter Pfeiffer

Inventor:
Vincent Bendix
By K. J. Jaeker
Atty.

UNITED STATES PATENT OFFICE.

VINCENT BENDIX, OF CHICAGO, ILLINOIS, ASSIGNOR TO THE BENDIX COMPANY, OF CHICAGO, ILLINOIS, A CORPORATION OF SOUTH DAKOTA.

FRICTION-DRIVE FOR MOTOR-VEHICLES.

No. 905,980.      Specification of Letters Patent.      Patented Dec. 8, 1908.

Application filed August 7, 1906. Serial No. 329,632.

*To all whom it may concern:*

Be it known that I, VINCENT BENDIX, a citizen of the United States, residing at Chicago, in the county of Cook and State of Illinois, have invented a new and useful Friction-Drive for Motor-Vehicles, of which the following is a specification.

My invention relates to friction drives comprising at least one pair of friction disks and one pair of friction wheels, and the objects of my invention are, first, to provide a large frictional contact; second, to so arrange the friction disks and friction wheels as to compensate for the difference in distance traveled by the different traction wheels in deviating the course of the vehicle from a straight line; third, to enable increasing or decreasing the speed of the vehicle in either a forward or backward direction by simultaneously moving the wheels in either direction past the center and radially across the face of their respective coöperating disks on either side of said center as the case may be; fourth, to make a strong, durable and compact construction and other objects to become apparent from the description to follow.

By the use of my invention a larger frictional contact can be obtained than has been possible with one pair of disks, the lost motion caused by slipping is reduced to a minimum and there being a pair of friction wheels for each driven traction wheel the disks will slip enough to compensate for the difference in speed of the traction wheels when the vehicle is turned out of a straight course.

Figure 1:
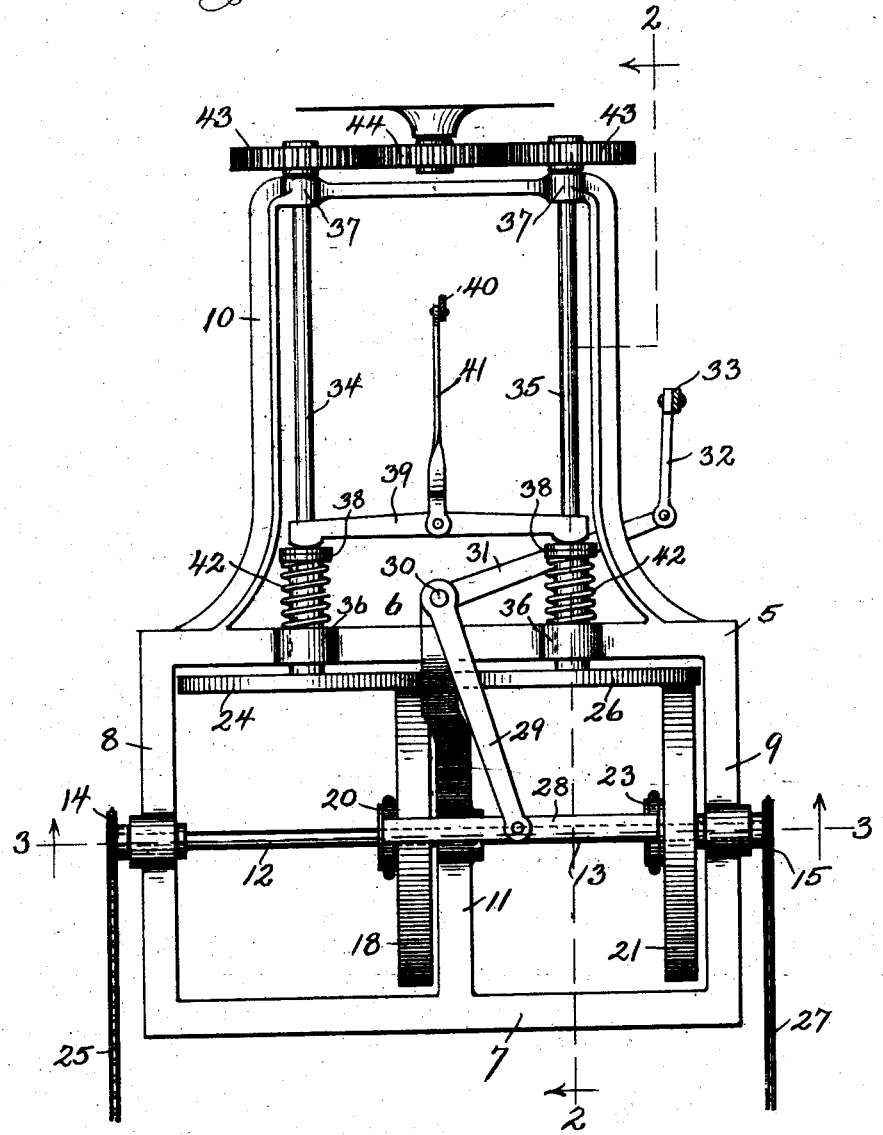
Figure 2:
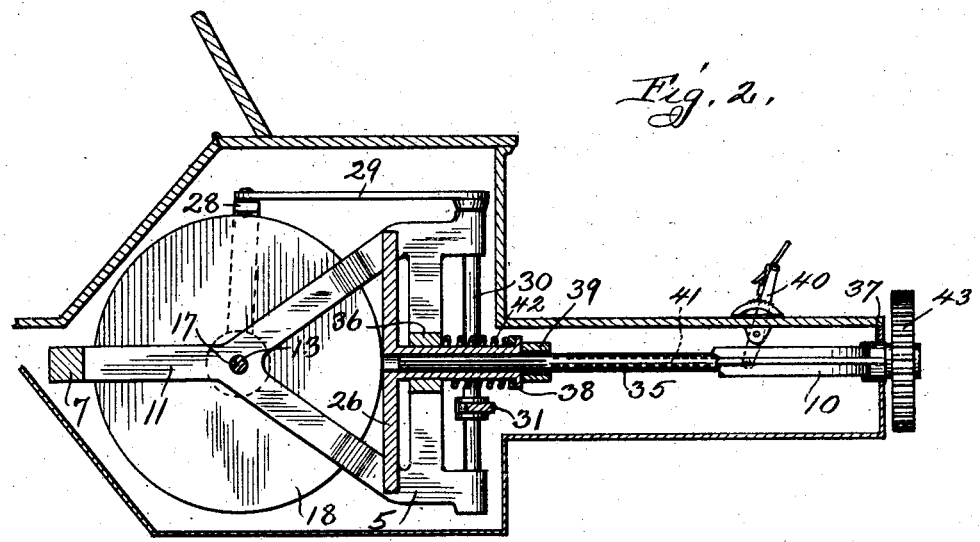
Figure 3:
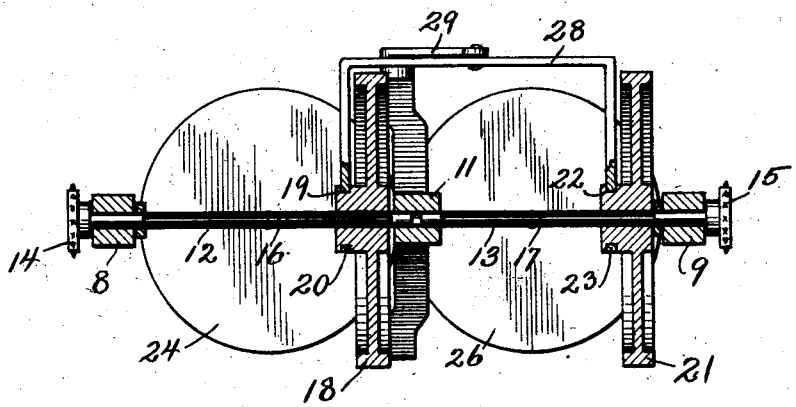

I have illustrated my invention on the accompanying two sheets of drawings forming a part of this specification in which:

Figure 1 is a plan view of a motor vehicle frame and driving gear embodying my invention; Fig. 2, is a section on 2—2 of Fig. 1, and Fig. 3, is a section on 3—3 of Fig. 1, partly in elevation.

Similar reference characters refer to similar parts throughout the several views.

To properly mount the working parts a frame 5 is provided which preferably has the rectangular portion formed by the four members 6, 7, 8 and 9, and the forwardly extending portion 10. A cross-piece 11 is provided in about the middle of the rectangular frame to support bearings for the two shafts 12 and 13. The shaft 12 extends from the cross-piece 11 through a bearing on member 8 and has the sprocket wheel 14 secured on its end just outside of the member 8. The shaft 13 extends in alinement with shaft 12 from the cross-piece 11 through a bearing on member 9 and has the sprocket wheel 15 secured on its end just outside of the member 9. The shaft 12 is provided with a spline 16 between the cross-piece 11 and member 8 and likewise the shaft 13 is provided with a spline 17 between the cross-piece 11 and member 9.

A friction wheel 18 is mounted to slide on shaft 12 and is arranged to turn with said shaft by having a key fitting snugly into the spline 16. The hub of wheel 18 is provided with a circumferential slot 19 into which is slidingly fitted a ring 20. A friction wheel 21 is mounted to slide on shaft 13 and is arranged to turn with said shaft by having a key fitting snugly into the spline 17. The hub of wheel 21 is provided with a circumferential slot 22 into which is slidingly fitted a ring 23.

An inverted U shaped bar having its extremities rigidly secured to ring 20 and ring 23 serves to move the wheels 18 and 21 simultaneously along on their respective shafts by means of lever connections to be described. A friction disk 24 is mounted to rotate about an axis intersecting the center line of shaft 12 and is arranged to be forced laterally against the periphery of wheel 18 so as to rotate the same through frictional contact. The wheel 18 being keyed to shaft 12 will cause the sprocket wheel 14 to rotate. A chain 25 serves to transmit motion from the sprocket wheel 14 to one of the rear traction wheels of the vehicle not shown. To transmit motion to the other rear traction wheel, a second friction disk 26 is mounted to rotate about an axis intersecting the center line of shaft 13 and is arranged to be forced laterally against the periphery of wheel 21 so as to rotate the same through frictional contact. The wheel 21 being keyed to shaft 13 will cause the sprocket wheel 15 to rotate, and the chain 27 serves to transmit motion from sprocket wheel 15 to the other rear traction wheel of the vehicle not shown.

It is obvious that the transmission of power from shafts 12 and 13 to the respective rear traction wheels is not limited to chain and sprocket construction, and that all four wheels of the vehicle may be driven by applying to the two front wheels a form of power transmission similar to that provided for the rear wheels.

When the arrangement of the several parts are as illustrated in the drawings the two disks 24 and 26 must be driven to rotate in the same direction to propel the vehicle. It is obvious that the respective arrangement of the wheels 18 and 21 and the disks 24 and 26 can be changed without in the least departing from the spirit of the invention, and I wish to be understood as claiming in this application broadly a driving mechanism for automobiles comprising a pair of friction wheels frictionally coöperating with a pair of friction disks each of said wheels and disks being mounted on a different shaft arranged in such manner that two traction wheels of the vehicle will be independently driven and that one traction wheel is permitted to travel or rotate faster than the other by one or both of said frictional contacts slipping.

It is obvious that if the direction of rotation of the disks 24 and 26 be changed the lateral movement of the wheels 18 and 21 can be correspondingly changed to drive both traction wheels in the same direction.

I have shown the wheels 18 and 21 mounted to be moved more than half way across the face of the disks 24 and 26 which permits the wheels 18 and 21 and therefore the sprocket wheels 14 and 15 to be rotated in either direction while the disks 24 and 26 are constantly rotating in the same direction.

As clearly shown in the drawings the disks 24 and 26 are continuously driven by direct connection with the driving shaft; in the particular arrangement illustrated these disks both rotate in the same direction. When it is desired to have the vehicle travel at the highest rate of speed the wheels 18 and 21 are shifted so as to contact with the disks 24 and 26 near their peripheral edge; and when it is desired to have the vehicle travel at a low rate of speed the wheels 18 and 21 are shifted so as to contact with the disks 24 and 26 near their centers. It will be understood that the wheels 18 and 21 will not be rotated when they are moved to such position as to contact with the centers of the disks 24 and 26 and if they are moved to a point beyond the centers of the disks 24 and 26, said wheels will be rotated in a reverse direction, and consequently the vehicle will be propelled in a reverse direction. In this particular arrangement the wheels 18 and 21 must be moved along their respective shafts equal distances in the same direction and at the same time. To accomplish this the collars 20 and 22 are rigidly connected by an inverted U shaped bar 28, which has pivoted thereto the free end of an arm 29 which is secured to the top end of the vertical shaft 30 mounted in the frame 5. Another arm 31 is secured to shaft 30 which has its free end connected by a link 32 to the lower end of the hand lever 33. When the hand lever 33 is moved in one direction the wheels 18 and 21 will be moved in a certain direction along their respective shafts and when the hand lever is moved in the opposite direction the wheels 18 and 21 are moved along on their shafts in an opposite direction. For causing and releasing the frictional contact between the wheels 18 and 21 and the pair of disks 24 and 26 either pair may be movable toward and away from the other pair. I have shown the disks 24 and 26 as being movable toward and away from the wheels 18 and 21, by being slidingly keyed to the shafts 34 and 35 which are mounted in the frame 5, in the bearings 36 and 37. The hubs of the disks 24 and 26 preferably are made long enough to extend through the bearings 36 and their ends are provided with an enlarged collar or head 38. A bar 39 extends from shaft 34 to shaft 35 and has its ends arranged to engage the ends or collars 38 so as to force the disks 24 and 26 against the wheels 18 and 21, when pressure is brought against the foot lever 40 which is connected to bar 39 by the link 41. To normally hold the disks 24 and 26 disengaged from the wheels 18 and 21 the coiled expanding springs 42 are interposed between the collars 38 and the bearings 36. Any convenient means for constantly rotating shafts 34 and 35 may be provided as for instance the gears 43 secured on shafts 34 and 35 meshing with gear 44 which may be secured to the motor shaft.

I have shown one means of moving the disks 24 and 26 toward and away from the wheels 18 and 21, but any other means simply requiring the skill of a mechanic can be used in place of this one. It will also be understood that instead of moving the disks 24 and 26 the wheels 18 and 21 may be moved toward and away from the disks. It is however preferred to arrange the lever mechanism so that the pressure exerted will be equalized on both disks.

The levers for shifting the wheels 18 and 21 and the disks 24 and 26 may be arranged any convenient way without deviating from the invention.

Having thus fully described my invention, what I claim as new and desire to secure by Letters Patent of the United States is:

1. In a friction drive for motor vehicles, a pair of parallel shafts, a pair of driving friction disks or wheels mounted on said shafts, a pair of coaxial shafts, a pair of driven wheels or disks mounted on said coaxial shafts and means for forcing one pair of friction wheels or disks toward and away from the other pair of friction disks or wheels comprising an equalizing mechanism.

2. In a friction drive for motor vehicles, a pair of parallel shafts arranged side by side, a pair of driving friction disks or wheels mounted on said shafts, a pair of coaxial shafts, a pair of driven friction wheels or disks movably splined on said pair of coaxial shafts and means for moving one pair of friction disks or wheels toward and away from the other pair of friction wheels or disks comprising an equalizing mechanism.

3. In a friction drive for motor vehicles, a plurality of parallel shafts arranged side by side, a driving friction disk mounted on each of said shafts, a plurality of coaxial shafts, a driven friction wheel slidingly splined on each of said coaxial shafts and means for forcing said friction disks and said friction wheels against and away from each other.

4. In a friction drive for motor vehicles, a plurality of parallel shafts arranged side by side, a driving friction disk mounted on each of said shafts, a plurality of coaxial shafts, a driven friction wheel slidingly splined on each of said coaxial shafts, means for forcing said friction disks and said friction wheels against and away from each other and means for moving said friction wheels along on their respective shafts.

5. In a friction drive for motor vehicles, two shafts arranged side by side, a driving friction disk in the same plane mounted on each of said shafts, two coaxial shafts, a driven friction wheel slidingly splined on each of said coaxial shafts, and means for moving said friction disks toward and away from said friction wheels.

6. In a friction drive for motor vehicles, two shafts arranged side by side, a driving friction disk mounted on each of said shafts, two shafts not arranged side by side, a driven friction wheel slidingly splined on each of said second named shafts, means for moving said friction disks toward and away from said friction wheels, and means for moving said friction wheels along on their respective shafts.

7. In a friction drive for motor vehicles, a driving gear, two companion gears meshing with said driving gear, a driving friction disk having constant positive operative connection with each of said companion gears, two shafts, a driven friction wheel mounted on each of said shafts and means comprising an equalizing mechanism for simultaneously moving said friction disks laterally.

8. In a friction drive for motor vehicles, a driving gear, two companion gears meshing with said driving gear, a friction disk having constant positive operative connection with each of said companion gears, two shafts, a driven friction wheel slidingly splined on each of said shafts, means for simultaneously moving said friction disks toward said friction wheels and away from said gears, and means for simultaneously moving said friction wheels along on their respective shafts.

9. In a friction drive for motor vehicles, two shafts, a driving gear, a driven gear rigidly mounted on each of said shafts meshing with said driving gear, a driving friction disk slidingly keyed on each of said shafts, a second two shafts, a driven friction wheel slidingly splined on each of said two second named shafts, means for moving said friction disks on their shafts and means for moving said friction wheels on their shafts.

10. In a friction drive for motor vehicles, two shafts, a driving gear, a driven gear rigidly mounted on each of said shafts meshing with said driving gear, a driving friction disk slidingly keyed on each of said shafts, a second two shafts, a driven friction wheel slidingly splined on each of said two second named shafts, means comprising an equalizing mechanism for moving said friction disks on their respective shafts and means for moving said friction wheels on their respective shafts.

11. In a friction drive for motor vehicles, two shafts arranged side by side rotated in the same direction, a driving friction disk mounted on each of said shafts, two shafts not arranged side by side rotated in the same direction and a driven friction wheel mounted on each of said second named shafts.

12. In a friction drive for motor vehicles, two shafts, a driving friction disk mounted on each of said shafts having their frictional surface facing in the same direction, a second two shafts, a driven friction wheel slidingly mounted on each of said second named shafts, means for forcing said friction disks and said friction wheels together and apart, and means for laterally moving said friction wheels on their respective shafts.

13. In a friction drive for motor vehicles, two shafts, a driving friction disk mounted on each of said shafts having their working surfaces facing in the same direction, a second two shafts, a driven friction wheel slidingly mounted on each of said second named shafts arranged to be engaged by said friction disks, and means for shifting said friction wheels diametrically across the face of said friction disks, whereby said friction wheels are rotated in either direction while the periphery of each remains in juxtaposition with the face of its single and only coöperating friction disk.

14. In a friction drive for motor vehicles, a plurality of shafts and means to rotate them in the same direction, a driving friction disk mounted on each of said shafts having their frictional surfaces facing in the same direction, a second plurality of shafts, a driven friction wheel slidingly mounted on each of said second named shafts, means for forcing said friction disks and said friction wheels together, and means for laterally moving said friction wheels on their respective shafts.

15. In a friction drive for motor vehicles, a plurality of shafts and means to rotate them together in the same direction, a driving friction disk mounted on each of said shafts having their working surfaces facing in the same direction, a second plurality of shafts, a driven friction wheel slidingly mounted on each of said second named shafts arranged to be engaged by said friction disks, and means for shifting said friction wheels diametrically across the face of said friction disks, whereby said friction wheels are rotated in either direction while the periphery of each remains in juxtaposition with the face of its single and only coöperating friction disk.

16. In a friction drive for motor vehicles, two shafts rotated in the same direction, a driving friction disk mounted on each of said shafts having their frictional surfaces facing in the same direction, two shafts rotated in the same direction, a driven friction wheel slidingly keyed on each of said second named shafts, means for forcing the face of each friction disk against and away from the periphery of its coöperating friction wheel, and means for simultaneously shifting the periphery of said frictional wheels diametrically in the same direction across the faces of said friction disks.

17. In a friction drive for motor vehicles, two parallel shafts, a driving friction disk mounted on each of said shafts, two coaxial shafts and a driven friction wheel mounted on each of said coaxial shafts.

18. In a friction drive for motor vehicles, a pair of driving friction disks or wheels, a pair of independent coaxial shafts, a pair of driven friction wheels or disks movably splined on said independent shafts, and means for moving one pair of friction disks or wheels toward and away from the other pair of friction wheels or disks comprising an equalizing mechanism.

19. In a friction drive for motor vehicles, a plurality of parallel shafts, a driving friction disk mounted on each of said shafts, a plurality of coaxial shafts, a driven friction wheel slidingly splined on each of said coaxial shafts, and means for forcing said friction disks and said friction wheels against and away from each other.

20. In a friction drive for motor vehicles, a plurality of parallel shafts, a driving friction disk mounted on each of said shafts, a plurality of coaxial shafts, a driven friction wheel slidingly splined on each of said coaxial shafts, means for forcing said friction disks and said friction wheels against and away from each other and means for moving said friction wheels along on their respective shafts.

21. In a friction drive for motor vehicles, two parallel shafts, a driving friction wheel on each of said parallel shafts, two coaxial shafts, a driven friction wheel slidingly splined on each of said coaxial shafts, and means for moving said friction disks toward and away from said friction wheels.

22. In a friction drive for motor vehicles, two parallel shafts, a driving friction disk mounted on each of said shafts, two coaxial shafts, a driven friction wheel slidingly splined on each of said coaxial shafts, means for moving said friction disks toward and away from said friction wheels, and means for moving said friction wheels along on their respective shafts.

23. In a friction drive for motor vehicles, a driving gear, two companion gears meshing with said driving gear, a driving friction disk having constant positive operative connection with each of said companion gears, two coaxial shafts, a driven friction wheel mounted on each of said coaxial shafts and means comprising an equalizing mechanism for simultaneously moving said friction disks laterally.

24. In a friction drive for motor vehicles, a driving gear, two companion gears meshing with said driving gear, a driving friction disk having constant positive operative connection with each of said companion gears, two coaxial shafts, a driven friction wheel slidingly splined on each of said coaxial shafts, means for simultaneously moving said friction disks toward said friction wheels and away from said gears, and means for simultaneously moving said friction wheels along on their respective shafts.

25. In a friction drive for motor vehicles, two parallel shafts, a driving gear, a driven gear rigidly mounted on each of said shafts meshing with said driving gear a driving friction disk slidingly keyed on each of said parallel shafts, two coaxial shafts, a driven friction wheel slidingly splined on each of said two coaxial shafts, means for moving said friction disks on their shafts and means for moving said friction wheels on their shafts.

26. In a friction drive for motor vehicles, two parallel shafts, a driving gear, a driven gear rigidly mounted on each of said parallel shafts meshing with said driving gear, a driving friction disk slidingly keyed on each of said parallel shafts, two coaxial shafts, a driven friction wheel slidingly splined on each of said two coaxial shafts, means comprising an equalizing mechanism for moving said friction disks on their respective shafts and means for moving said friction wheels on their respective shafts.

27. In a friction drive for motor vehicles, two parallel shafts, a driving friction disk mounted on each of said shafts, two coaxial shafts, a driven friction wheel slidingly mounted on each of said coaxial shafts, means for forcing said friction disks and said friction wheels together and apart, and means for laterally moving said friction wheels on their respective shafts.

28. In a friction drive for motor vehicles, two parallel shafts, a driving friction disk mounted on each of said shafts, two coaxial shafts, a driven friction wheel slidingly mounted on each of said coaxial shafts arranged to be engaged by said friction disks and means for shifting said friction wheels diametrically across the face of said friction disks, whereby said friction wheels are rotated in either direction while the periphery of each remains in juxtaposition with the face of its single and only coöperating friction disk.

29. In a friction drive for motor vehicles, a plurality of parallel shafts, a driving friction disk mounted on each of said parallel shafts, a plurality of coaxial shafts a driven friction wheel slidingly mounted on each of said coaxial shafts, means for forcing said friction disks and said friction wheels together, and means for laterally moving said friction wheels on their respective shafts.

30. In a friction drive for motor vehicles, a plurality of parallel shafts, a driving friction disk mounted on each of said parallel shafts, a plurality of coaxial shafts a driven friction wheel slidingly mounted on each of said coaxial shafts arranged to be engaged by said friction disks, and means for shifting said friction wheels diametrically across the face of said friction disks, whereby said friction wheels are rotated in either direction while the periphery of each remains in juxtaposition with the face of its single and only coöperating friction disk.

31. In a friction drive for motor vehicles, two parallel shafts, a driving friction disk mounted on each of said parallel shafts, two coaxial shafts, a driven friction wheel slidingly keyed on each of said coaxial shafts, means for forcing the face of each friction disk against or away from the periphery of its coöperating friction wheel, and means for simultaneously shifting the periphery of said friction wheels diametrically in the same direction across the faces of said friction disks.

32. In a friction drive for motor vehicles, two friction disks with their frictional surfaces facing in the same direction and positive means to rotate them in the same direction comprising a driving gear meshing with a gear on each of said shafts.

33. In a friction drive for motor vehicles, two friction disks rotated in the same direction with their working surfaces facing in the same direction and two friction wheels having their peripheries in contact with said friction disks, whereby they are rotated in the same direction.

34. In a frictional drive for motor vehicles, a plurality of friction disks and means to rotate them in the same direction having their frictional surfaces in the same plane and a plurality of coaxial friction wheels mounted to contact with said friction disks.

35. In a friction drive for motor vehicles, a plurality of coaxial shafts, a friction wheel slidingly mounted on each of said shafts, and means for simultaneously moving said friction wheels in the same direction.

In testimony whereof I have signed my name to this specification in presence of two subscribing witnesses this 4th day of August, 1906, at Chicago, Illinois.

VINCENT BENDIX

Witnesses:
R. J. JACKER,
DANIEL GRIER.